(12) United States Patent
Vaidyanathan et al.

(10) Patent No.: US 7,676,809 B2
(45) Date of Patent: Mar. 9, 2010

(54) SYSTEM, APPARATUS AND METHOD OF ENHANCING PRIORITY BOOSTING OF SCHEDULED THREADS

(75) Inventors: Basu Vaidyanathan, Austin, TX (US); Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1521 days.

(21) Appl. No.: 10/682,387

(22) Filed: Oct. 9, 2003

(65) Prior Publication Data

US 2005/0080824 A1      Apr. 14, 2005

(51) Int. Cl.
*G06F 9/38* (2006.01)
(52) U.S. Cl. ............. 718/103; 711/100; 711/148; 711/151; 707/200; 707/204; 718/100; 718/102; 712/1; 712/13; 712/25; 712/220
(58) Field of Classification Search .......... 711/100; 718/100
See application file for complete search history.

(56) References Cited

U.S. PATENT DOCUMENTS

| | | | | | |
|---|---|---|---|---|---|
| 5,630,128 | A | * | 5/1997 | Farrell et al. | 718/103 |
| 6,167,424 | A | * | 12/2000 | Bak et al. | 718/100 |
| 2004/0160446 | A1 | * | 8/2004 | Gosalia et al. | 345/503 |

* cited by examiner

*Primary Examiner*—Neveen Abel Jalil
*Assistant Examiner*—Farhan M Syed
(74) *Attorney, Agent, or Firm*—VanLeeuwen & VanLeeuwen; Diana R. Gerhardt

(57) ABSTRACT

A system, apparatus and method of enhancing priority boosting of scheduled threads are provided. If, while being executed by a second CPU, a second thread determines that it has to wait for a lock on a shared resource held by a first thread that is scheduled to be executed by a first CPU, the second thread may boost the priority of the first thread by passing its priority to the first thread if its priority is higher than the first thread's priority. Further, to enhance the priority boost of the first thread, the second thread may reschedule the first thread to be processed by the second CPU. By having been rescheduled on the second CPU, the second thread may be dispatched for execution right thereafter.

20 Claims, 5 Drawing Sheets

SYSTEM, APPARATUS AND METHOD OF ENHANCING PRIORITY BOOSTING OF SCHEDULED THREADS

BACKGROUND OF THE INVENTION

1. Technical Field

The present invention is directed to resource allocations in a computer system. More specifically, the present invention is directed to a system, apparatus and method of enhancing priority boosting of a scheduled thread.

2. Description of Related Art

At any given processing time, there may be a multiplicity of processes or threads waiting to be executed on a processor or CPU of a computing system. To best utilize the CPU of the system then, it is necessary that an efficient mechanism that properly queues the processes or threads for execution be used. The mechanism used by most computer systems to accomplish this task is a scheduler.

Note that a process is a program. When a program is executing, it is loosely referred to as a task. In most operating systems, there is a one-to-one relationship between a task and a program. However, some operating systems allow a program to be divided into multiple tasks or threads. Such systems are called multithreaded operating systems. For the purpose of simplicity, threads and processes will henceforth be used interchangeably.

A scheduler is a software program that coordinates the use of a computer system's shared resources (e.g., a CPU). The scheduler usually uses an algorithm such as a first-in, first-out (i.e., FIFO), round robin or last-in, first-out (LIFO), a priority queue, a tree etc. algorithm or a combination thereof in doing so. Basically, if a computer system has three CPUs ($CPU_1$, $CPU_2$ and $CPU_3$), each CPU will accordingly have a ready-to-be-processed queue or run queue. If the algorithm in use to assign processes to the run queue is the round robin algorithm and if the last process created was assigned to the queue associated with $CPU_2$, then the next process created will be assigned to the queue of $CPU_3$. The next created process will then be assigned to the queue associated with $CPU_1$ and so on. Thus, schedulers are designed to give each process a fair share of a computer system's resources.

Sometimes a system administrator may want different processes to receive a different share of the CPU time, for example. In that case, a workload manager (WLM) is used in conjunction with the scheduler. The WLM assigns a priority number to each process. Each time a process consumes some CPU time, its priority number is reduced. This scheme allows processes that have a lower priority number to nonetheless receive some CPU time.

When a process is being processed by a CPU and for some reason needs to wait for an event to occur before proceeding, for efficiency reasons, the process may cede the rest of its turn at the CPU to another process and goes to sleep. If the process has a lock on a shared kernel resource, it will not relinquish the lock before it goes to sleep. For example, when a first process is using a shared kernel resource such as a buffer, it will put a lock on the buffer to prevent all other processes from using the buffer. If the first process was performing some disk input/output (I/O), it may allow another process to use the CPU and go to sleep while the disk I/O is completing. Once the disk I/O has completed, the first process may awaken. If a second process with a higher priority number needs to use the buffer in the mean time, it will have to wait until the first process obtains some CPU time to complete its task and release the lock on the buffer.

To reduce the amount of time the second process may have to wait, priority boosting has been used. Priority boosting occurs when a second process with a higher priority number passes its priority number to a first process with a lower priority number and which has a lock on a needed shared resource to increase the first process' likelihood at being the next process chosen to receive some CPU time. As will be explained later, although it now has a higher priority number, the first process may not obtain the CPU right away if another process is currently using the CPU.

Thus, what is needed is a system and method of enhancing priority boosting such that a process that has a lock on a shared resource and whose priority has been boosted may obtain some CPU time as soon as possible.

SUMMARY OF THE INVENTION

The present invention provides a system, apparatus and method of enhancing priority boosting of scheduled threads. If, while being executed by a second CPU, a second thread determines that it has to wait for a lock on a shared resource held by a first thread that is scheduled to be executed by a first CPU, the second thread may boost the priority of the first thread by passing its priority to the first thread if its priority is higher than the first thread's priority. Further, to enhance the priority boost of the first thread, the second thread may reschedule the first thread to be processed by the second CPU. By having been rescheduled on the second CPU, the second thread may be dispatched for execution right thereafter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
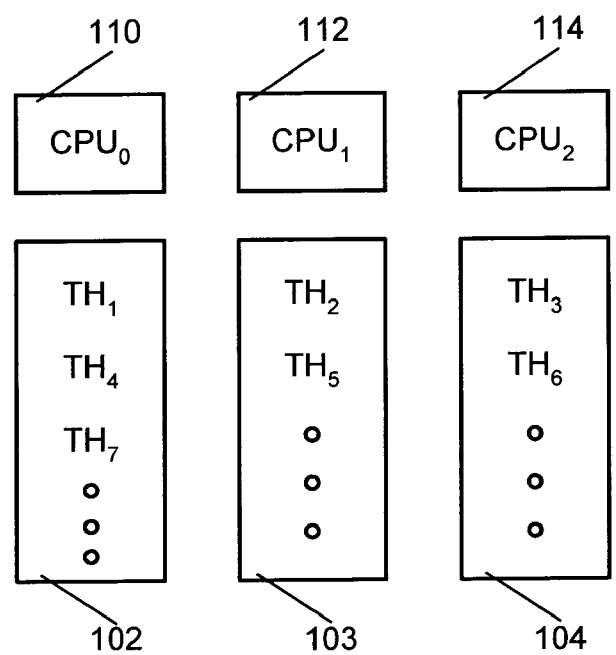
FIG. 1a depicts run queues of a multiprocessor computer system.

With reference now to the figures, FIG. 1a depicts run queues of a multiprocessor computer system. The computer system contains three processors, $CPU_0$ 110, $CPU_1$ 112 and $CPU_2$ 114. $CPU_0$ 110 has a run queue 102. Threads $Th_1$, $Th_4$, $Th_7$ etc. are scheduled to run on $CPU_0$ 110 and thus are in run queue 102. Likewise, $CPU_1$ 112 has a run queue 103 in which threads $Th_2$, $Th_5$, etc., which are scheduled to run on $CPU_1$ 112, are placed and $CPU_2$ 114 has a run queue 104 in which threads $Th_3$, $Th_6$, etc., which are scheduled to run on $CPU_2$ 114 are placed. The threads will be dispatched for execution in their order in the run queues unless a new thread with a higher priority is placed in the run queues.

When $CPU_0$ 110 is ready to process $Th_1$, $Th_1$ will be dispatched for execution. Now, suppose $Th_1$'s task is to load data into a buffer (not shown), then $Th_1$ will have a lock on the buffer to prevent other threads from using the buffer. Since disk I/O is a relatively slow process, while the disk I/O is being performed, $Th_1$ may go to sleep and relinquish $CPU_0$ 110. Since $Th_1$ is not presently using $CPU_0$ 110, $Th_4$ may now be dispatched to be processed by $CPU_0$ 110. Suppose further that $Th_2$ is dispatched on $CPU_1$ 112 and needs to use the buffer, $Th_2$ will not be processed since it has to wait for $Th_1$ to release the lock on the buffer. For $Th_1$ to release the lock, it has to first obtain some processing time. To complete its task and release the lock on the buffer, $Th_1$ may receive processing time from any available processor in the computer system. However, for the purpose of explaining the invention, it will be assumed that $Th_1$ needs to receive some processing time on $CPU_0$ 110. Hence, $Th_1$ may have to wait until $Th_4$ has had its processing turn on $CPU_0$ 110 before it can continue.

As mentioned before, to increase the likelihood that $Th_1$ may be the next thread chosen to run on $CPU_0$ 110 after $Th_4$ has gotten its share of $CPU_0$ time, priority boosting may be used. In that case, when $Th_2$ realizes that it has to wait for the lock to be released by $Th_1$, it will pass its priority number to $Th_1$. The problem, however, is that unless $CPU_0$ 110 is executing kernel code that can notice the priority boost, $CPU_0$ 110 may not notice the priority boost up to 10 milliseconds (ms) thereafter when a time slice interrupt occurs. In most Unix-based systems, time slice interrupts occur periodically (e.g., every 10 ms) and are used by the kernel to check to see whether a thread with a higher priority is ready to run while the CPU is processing a thread with a lower priority.

To continue with the example above, after thread $Th_1$ has received the priority boost, it may still have to wait up to 10 ms before it may be processed once more by $CPU_0$ 110. 10 ms in computer time is a long time. The present invention provides an algorithm that may be used to enhance priority boosting of a scheduled thread.

According to the invention, after passing its priority to $Th_1$, $Th_2$ may also hand off its CPU time to $Th_1$ by pulling $Th_1$ into $CPU_1$'s run queue before it goes to sleep. Based on this priority, $Th_1$ may be dispatched for execution right after it has been pulled into $CPU_1$'s run queue if it has already been awakened (i.e., the disk I/O has completed). Thus $Th_5$, the next thread scheduled to run on $CPU_1$, will now have to wait before being dispatched for execution.

Figure 1B:
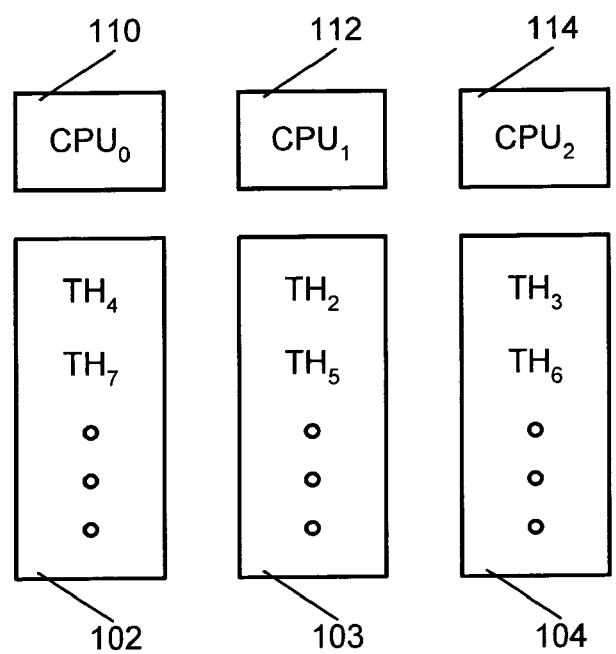
FIG. 1b depicts the run queues of the multiprocessor system after $Th_1$ has been dispatched.
Figure 1C:
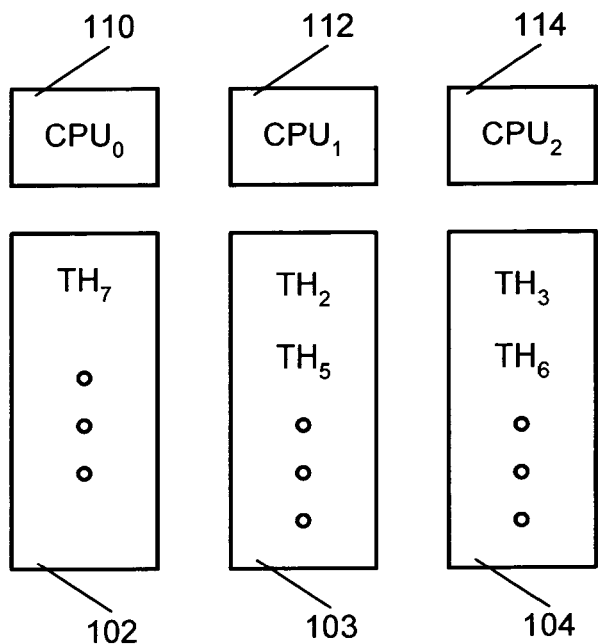
FIG. 1c depicts the run queues of the multiprocessor after $Th_4$ has been dispatched.
Figure 1D:
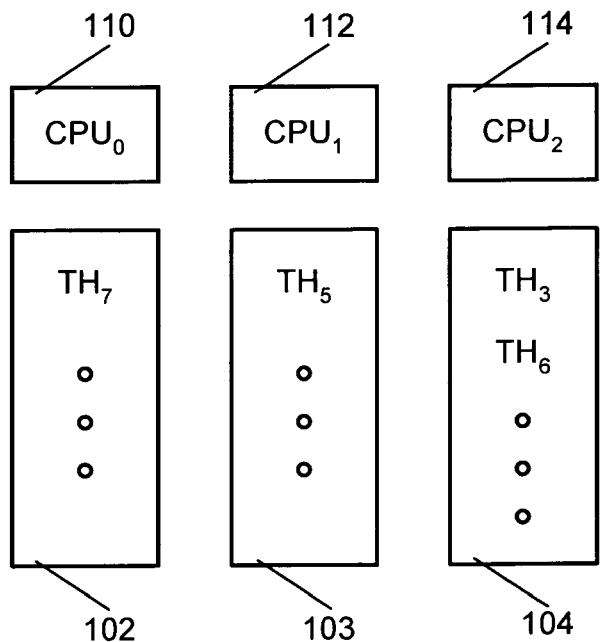
FIG. 1d depicts the run queues of the multiprocessor after $Th_2$ has been dispatched.
Figure 1E:
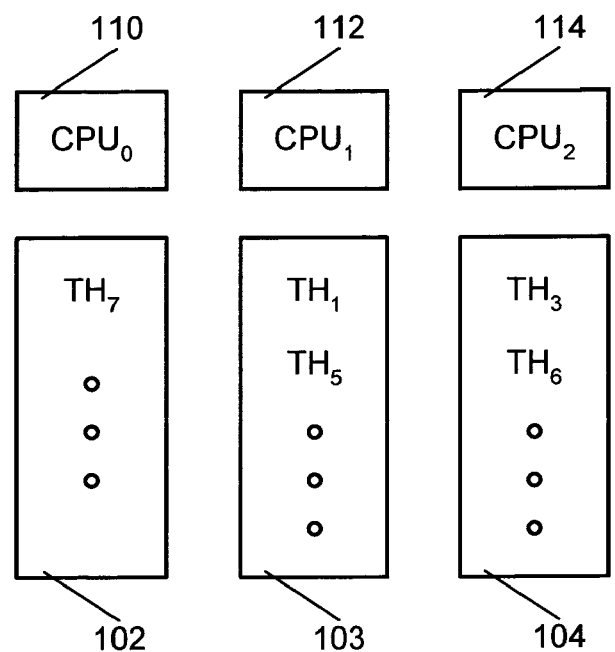
FIG. 1e depicts the run queues of the multiprocessor after an awakened $Th_1$ has been pulled into the run queue of $CPU_1$.
Figure 1F:
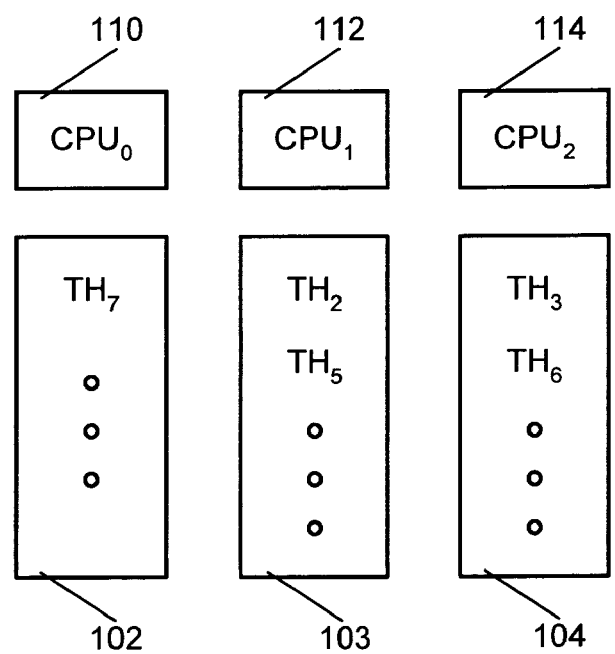
FIG. 1f depicts the run queues of the multiprocessor after $Th_1$ has released a lock needed by $Th_2$ (i.e., $Th_2$ has awakened) and provided that the priority of $Th_2$ remains higher than that of $Th_5$.

FIG. 1b depicts the run queues of the multiprocessor system after $Th_1$ has been dispatched. FIG. 1c depicts the run queues of the multiprocessor after $Th_4$ has been dispatched. FIG. 1d depicts the run queues of the multiprocessor after $Th_2$ has been dispatched. FIG. 1e depicts the run queues of the multiprocessor after an awakened $Th_1$ has been pulled into the run queue of $CPU_1$ 112. FIG. 1f depicts the run queues of the multiprocessor after $Th_1$ has released the lock (i.e., $Th_2$ has awakened) and provided that the priority of $Th_2$ remains higher than that of $Th_5$.

Figure 2:
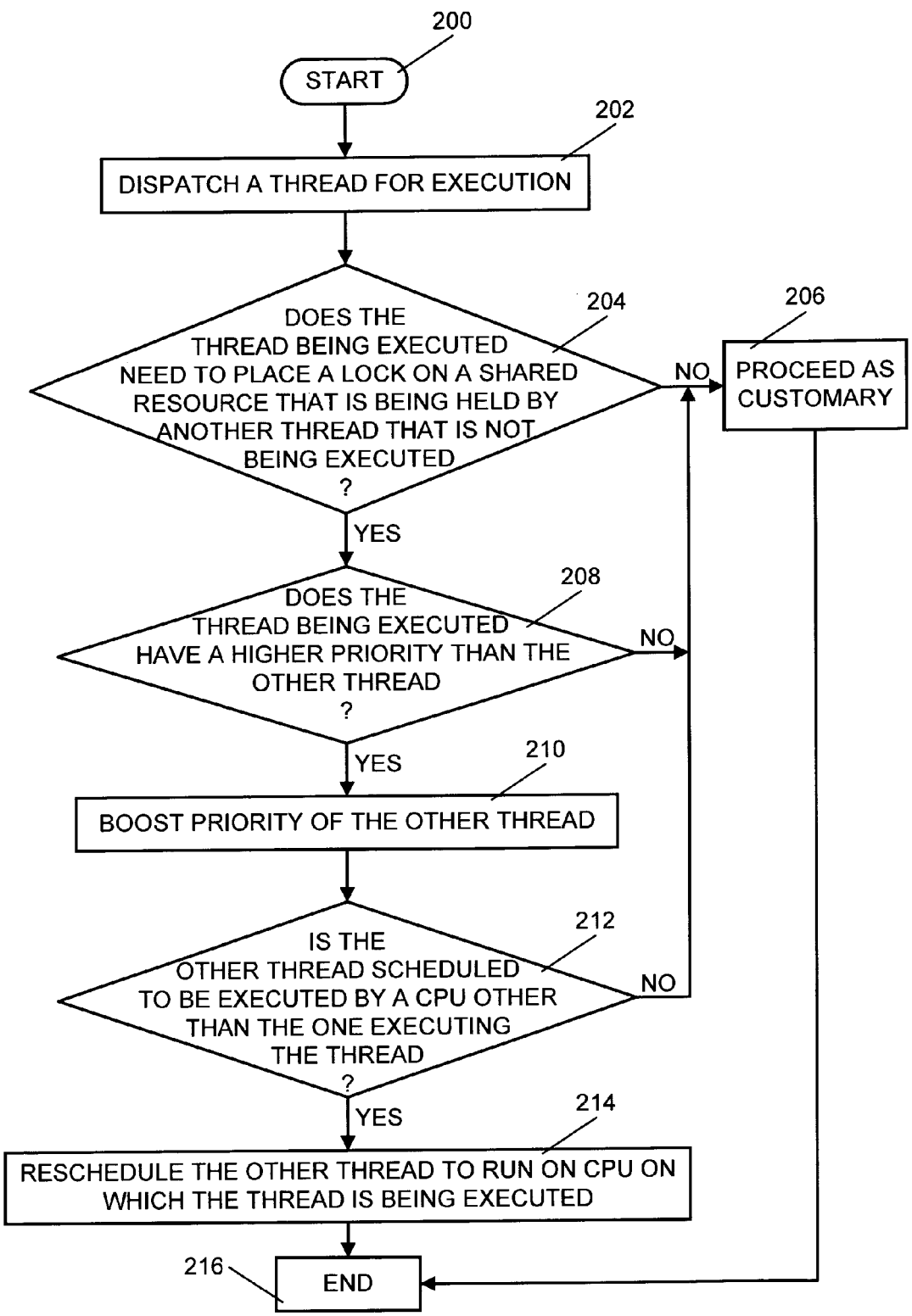
FIG. 2 is a flowchart of a process that may be used to implement the invention.

FIG. 2 is a flowchart of a process that may be used to implement the invention. The process starts when a thread (i.e., a second thread) has been dispatched to a second CPU for execution (steps 200 and 202). If while being executed, the second thread realizes that it needs to place a lock on a shared resource which is being held by a first thread, the second thread may check to see whether the first thread has a lower priority than its own. If so, the second thread may boost the priority of the first thread by passing to the first thread its own priority. That way the first thread may be dispatched faster for execution. After passing its own priority to the first thread, the second thread may again check to see whether the first thread is scheduled to run on a first CPU or the second CPU. If the first thread is scheduled to run on the first CPU, the first thread may be rescheduled to be executed on the second CPU before the process ends (steps 204, 208, 210, 212, 214 and 216).

If the second thread does not need to place a lock on a shared resource or if the second thread does not have a higher priority that the first thread or if the first thread is scheduled to be processed by the second CPU, the process may continue as customary before it ends (steps 204, 206 and 216 or 208, 206 and 216 or 212, 206 and 216, respectively).

Figure 3:
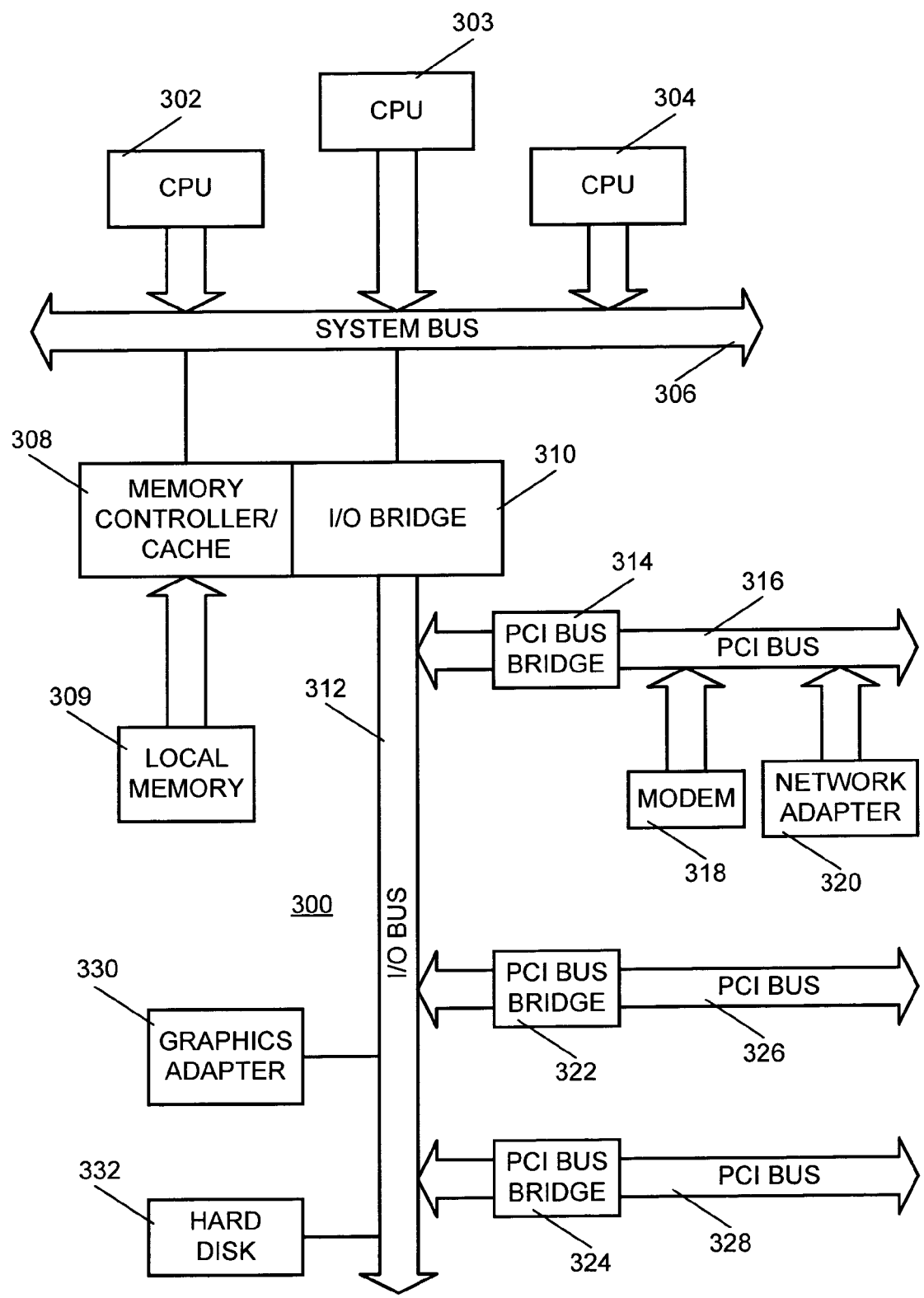
FIG. 3 is a block diagram of a data processing system on which the invention may be implemented.

FIG. 3 is a block diagram of a data processing system on which the invention may be implemented. Data processing system 300 may be a symmetric multiprocessor (SMP) system including a plurality of processors 302, 303 and 304 connected to system bus 306. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 216. A number of modems may be connected to PCI local bus 316. Typical PCI bus implementations will support four PCI expansion slots or add-in connectors. Network communications may be provided through modem 318 and network adapter 320 connected to PCI local bus 316 through add-in boards. Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM e-Server pSeries system, a product of International Business Machines Corporation in Armonk, N.Y., running the Advanced Interactive Executive (AIX) operating system or LINUX operating system.

The description of the present invention has been presented for purposes of illustration and description, and is not intended to be exhaustive or limited to the invention in the form disclosed. Many modifications and variations will be apparent to those of ordinary skill in the art. For example, threads of fixed priorities may be used rather than of variable priorities. Thus, the embodiment was chosen and described in order to best explain the principles of the invention, the practical application, and to enable others of ordinary skill in the art to understand the invention for various embodiments with various modifications as are suited to the particular use contemplated.

What is claimed is:

1. A method of enhancing priority boosting of scheduled threads comprising the steps of:

determining by a second thread being executed on a second CPU whether to wait for a lock on a shared resource held by a first thread that is scheduled to be executed by a first CPU, the second thread having a higher priority than the first thread;

boosting the priority of the first thread by passing the higher priority of the second thread to the first thread if the second thread has to wait for the lock on the shared thread; and enhancing the priority boosting of the first thread by rescheduling the first thread to run on the second CPU.

2. The method of claim 1 wherein when the priority boosting of the first thread is enhanced, the first thread becomes the next thread to be dispatched for execution.

3. The method of claim 2 wherein after the priority boosting of the first thread has been enhanced, the second thread relinquishes the second CPU by going to sleep awaiting the release of the lock by the first thread.

4. The method of claim 3 wherein after the first thread has released the lock, the second thread is awakened and rescheduled for execution by the second CPU.

5. The method of claim 4 wherein after being rescheduled for execution by the second CPU, the second thread is likely the next thread to be dispatched for execution.

6. A computer program product on a computer readable medium for enhancing priority boosting of scheduled threads comprising:

code means for determining by a second thread being executed on a second CPU whether to wait for a lock on a shared resource held by a first thread that is scheduled to be executed by a first CPU, the second thread having a higher priority than the first thread;

code means for boosting the priority of the first thread by passing the higher priority of the second thread to the first thread if the second thread has to wait for the lock on the shared thread; and code means for enhancing the priority boosting of the first thread by rescheduling the first thread to run on the second CPU.

7. The computer program product of claim 6 wherein when the priority boosting of the first thread is enhanced, the first thread becomes the next thread to be dispatched for execution.

8. The computer program product of claim 7 wherein after the priority boosting of the first thread has been enhanced, the second thread relinquishes the second CPU by going to sleep awaiting the release of the lock by the first thread.

9. The computer program product of claim 8 wherein after the first thread has released the lock, the second thread is awakened and rescheduled for execution by the second CPU.

10. The computer program product of claim 9 wherein after being rescheduled for execution by the second CPU, the second thread is likely the next thread to be dispatched for execution.

11. An apparatus for enhancing priority boosting of scheduled threads comprising:

means for determining by a second thread being executed on a second CPU whether to wait for a lock on a shared resource held by a first thread that is scheduled to be executed by a first CPU, the second thread having a higher priority than the first thread;

means for boosting the priority of the first thread by passing the higher priority of the second thread to the first thread if the second thread has to wait for the lock on the shared thread; and means for enhancing the priority boosting of the first thread by rescheduling the first thread to run on the second CPU.

12. The apparatus of claim 11 wherein when the priority boosting of the first thread is enhanced, the first thread becomes the next thread to be dispatched for execution.

13. The apparatus of claim 12 wherein after the priority boosting of the first thread has been enhanced, the second thread relinquishes the second CPU by going to sleep awaiting the release of the lock by the first thread.

14. The apparatus of claim 13 wherein after the first thread has released the lock, the second thread is awakened and rescheduled for execution by the second CPU.

15. The apparatus of claim 14 wherein after being rescheduled for execution by the second CPU, the second thread is likely the next thread to be dispatched for execution.

16. A system for enhancing priority boosting of scheduled threads comprising:

at least one storage device for storing code data; and at least two CPUs, one of the at least two CPUs for processing the code data to determine by a second thread being executed on the at least one CPU whether to wait for a lock on a shared resource held by a first thread that is scheduled to be executed by the other CPU, the second thread having a higher priority than the first thread, to boost the priority of the first thread by passing the higher priority of the second thread to the first thread if the second thread has to wait for the lock on the shared thread, and to enhance the priority boosting of the first thread by rescheduling the first thread to run on the second CPU.

17. The system of claim 16 wherein when the priority boosting of the first thread is enhanced, the first thread becomes the next thread to be dispatched for execution.

18. The system of claim 17 wherein after the priority boosting of the first thread has been enhanced, the second thread relinquishes the second CPU by going to sleep awaiting the release of the lock by the first thread.

19. The system of claim 18 wherein after the first thread has released the lock, the second thread is awakened and rescheduled for execution by the second CPU.

20. The system of claim 19 wherein after being rescheduled for execution by the second CPU, the second thread is likely the next thread to be dispatched for execution.

* * * * *